(12) United States Patent
Packer et al.

(10) Patent No.: US 7,887,398 B2
(45) Date of Patent: Feb. 15, 2011

(54) FAT REMOVAL AND RECOVERY SYSTEMS AND METHODS USING STEAM

(76) Inventors: Christopher L. Packer, 2464 45th Ave., Columbus, NE (US) 68601; Rodney Carl Perrin, 605 E. 20th, Schuyler, NE (US) 68661; Fuju Wu, East English St., Wichita, KS (US) 67218

( * ) Notice: Subject to any disclaimer, the term of this patent is extended or adjusted under 35 U.S.C. 154(b) by 0 days.

(21) Appl. No.: 12/436,414

(22) Filed: May 6, 2009

(65) Prior Publication Data

US 2009/0280735 A1    Nov. 12, 2009

Related U.S. Application Data

(60) Provisional application No. 61/126,719, filed on May 6, 2008, provisional application No. 61/051,335, filed on May 7, 2008.

(51) Int. Cl.
    *A22C 17/16* (2006.01)
(52) U.S. Cl. ..................................................... 452/134

(58) Field of Classification Search ................. 452/134, 452/198
    See application file for complete search history.

(56) References Cited

U.S. PATENT DOCUMENTS

| 3,846,869 | A | | 11/1974 | Barbee | |
|---|---|---|---|---|---|
| 4,028,526 | A | * | 6/1977 | Schossow | 392/337 |
| 4,030,162 | A | * | 6/1977 | Hubbard | 452/134 |
| 4,259,252 | A | | 3/1981 | Perry et al. | |

FOREIGN PATENT DOCUMENTS

| FR | 2184551 | 12/1973 |
|---|---|---|
| GB | 343388 | 2/1931 |
| GB | 850034 | 9/1960 |

* cited by examiner

*Primary Examiner*—Thomas Price

(57) ABSTRACT

Systems and methods for removing and/or recovering external fat from animal stomachs prior to further processing in an animal harvest facility are described herein.

21 Claims, 3 Drawing Sheets

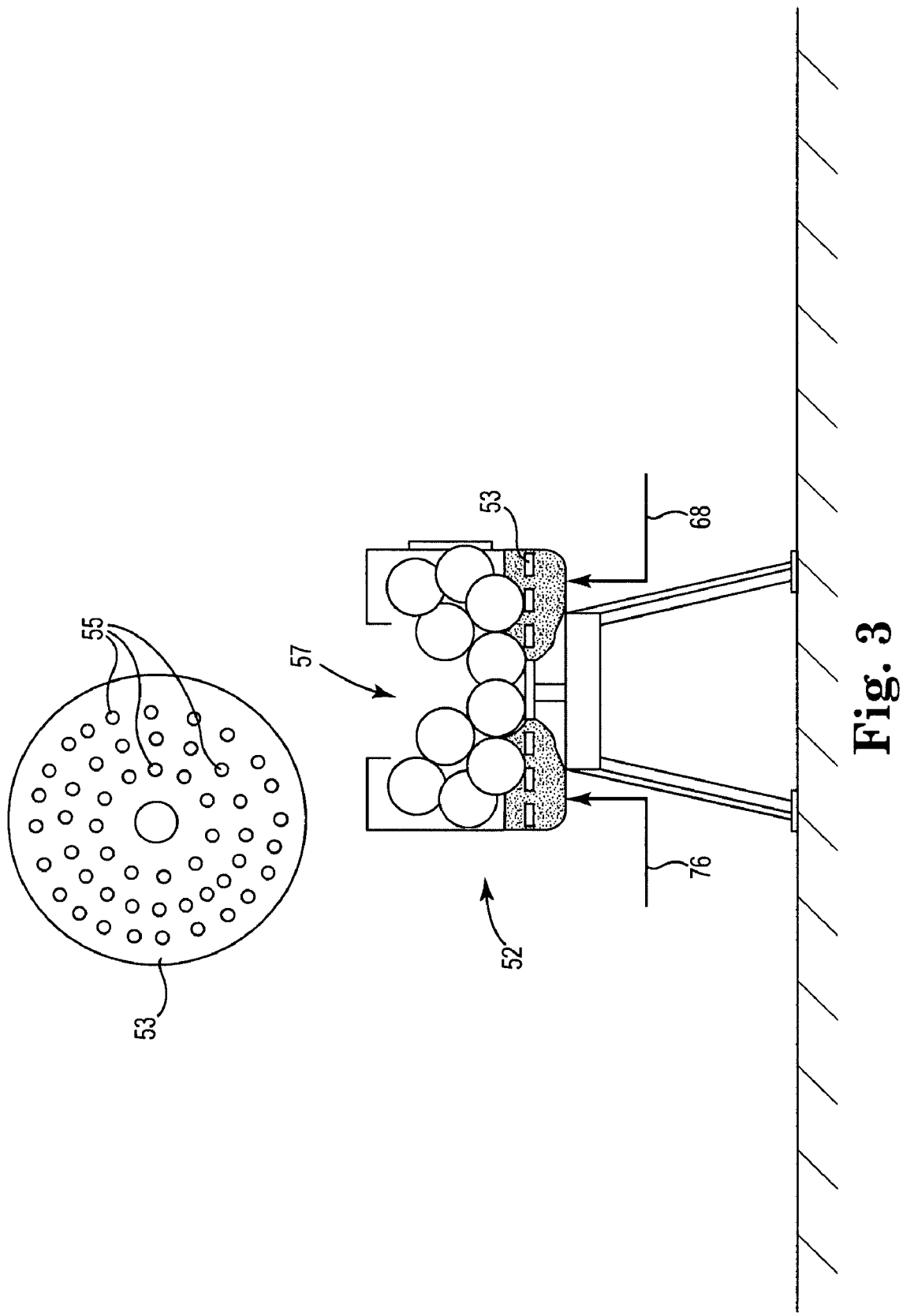

FAT REMOVAL AND RECOVERY SYSTEMS AND METHODS USING STEAM

CROSS REFERENCE TO RELATED APPLICATION

This application claims the benefit of U.S. Provisional Application Ser. No. 61/126,719 filed May 6, 2008 entitled FAT REMOVAL AND RECOVERY SYSTEMS AND METHODS USING STEAM, and U.S. Provisional Application Ser. No. 61/051,335, filed May 7, 2008, entitled FAT REMOVAL AND RECOVERY SYSTEMS AND METHODS USING STEAM, which are hereby incorporated by reference in their entirety.

TECHNICAL FIELD

Systems and methods of processing animal parts comprising external fat such as animal stomachs, for example, are described herein.

BACKGROUND

The stomachs of ruminant animals (bovine, ovine, and caprine) are commonly used in the production of edible products as well as inedible products. The stomachs are collectively known as tripe after further processing. Ruminants have four anatomical stomachs which include first the fumen (paunch), secondly the reticulum (honeycomb), thirdly the omasum (bible), and lastly the abomasum or (rennet). After the viscera (stomachs and internal organs) are removed from the animal during slaughter, the organs and stomachs are manually separated and moved to their respective product area for processing and packaging. As for the stomachs, the abomasum is cut to separate it from the small intestines and the omasum. The omasum is then removed from the rumen and reticulum.

The processing of omasum tripe typically involves manual removal of most of the external fat and removal of a ridge portion. The omasum is then cut in half to expose the inside folds and then it is washed and refined. The washing process involves using agitation and water to remove the stomach contents (ingesta) and other material from the product. The refining process uses abrasion to remove any remaining fat, connective tissue or contaminant from the surface of the tripe. Bleaching chemicals can also be used during this process. The time and temperature of water used during washing and refining is dependent on the quality of tripe being produced and has a wide range. The abomasum portion is typically washed to remove contents and trimmed of fat by hand before packaging. Processing of the rumen and reticulum typically include hanging the paunch on a moving chain, followed by opening of the rumen and reticulum to remove the ingesta. The rumen and reticulum sometimes pass through a rinse system to help remove ingesta as well. Fat on the exterior surface of the stomach is removed by hand or left in place at this point. The reticulum can be separated from the rumen or left together during subsequent washing and refining as described above.

Conventional processing for removing the external fat and related material involves manual removal or no removal at all, which can be labor intensive and costly. Manual removal of fat does not always result in total removal, and the remaining fat then needs to be removed in the washing and refining process or by post-process trimming. It is therefore desirable to efficiently remove as much fat as possible prior to washing and refining thereby reducing processing time and minimizing damage to the final product(s).

Washing and refining processes are described in U.S. Pat. Nos. 3,958,304, 6,348,226, and 7,261,628, the entire disclosures of which are incorporated by reference for all purposes. The washing and refining steps are needed to produce the edible tripe products and are not used as a method to recover the external fat. By allowing fat to remain on the stomachs upon washing and refining, the recovery of this fat for subsequent sale is also greatly reduced as it is mostly emulsified and thus unrecoverable.

SUMMARY

Systems and methods for removing and/or recovering external fat from animal parts, and/or organs such as animal stomachs prior to further processing in an animal harvest facility are described herein. More particularly, systems and methods for mechanical removal and/or subsequent recovery of external fat and tissue from the omasum, lumen, reticulum, and/or abomasum, either separately or in combination, following removal from a carcass are described. The disclosed systems and methods involve the use of steam and a computer-controlled machine system to automatically remove the fat from the exterior surface of the stomachs. Additionally, systems and methods described herein provide a pre-cleaning function that can aid in reducing the harshness of normal processing steps.

In an embodiment, a method for processing stomachs of ruminant animals is provided. The method comprises providing at least a portion a stomach of a ruminant animal, the at least a portion of a stomach having external fat and treating the at least a portion of a stomach with steam to remove at least a portion of the external fat.

In another embodiment, a method for reducing fat, oils, and greases in the wastewater stream of an animal processing facility is provided. The method comprises providing at least a portion a stomach of a ruminant animal, the at least a portion of a stomach having external fat; treating the at least a portion of a stomach with steam to remove at least a portion of the external fat; washing the at least a portion of a stomach after treating the at least a portion of a stomach with steam; and recovering at least a portion of the fat removed from the at least a portion of a stomach.

In another embodiments a system for processing stomachs of ruminant animals is provided. The system comprises a fat removal machine operatively coupled to a source of steam; a fat effluent drain operatively coupled to an inedible cooker; and a programmable logic controller.

BRIEF DESCRIPTION OF THE DRAWINGS

The above mentioned and other advantages of the disclosed systems and methods and the manner of attaining them, will become more apparent and the invention itself will be better understood by reference to the following description of the embodiments of the invention taken in conjunction with the accompanying drawings wherein:

FIG. 3 is a schematic view of an exemplary fat removal machine.

DETAILED DESCRIPTION

The exemplary embodiments described below are not intended to be exhaustive or to limit the invention to the precise forms disclosed in the following detailed description. Rather the exemplary embodiments are chosen and described so that others skilled in the art may appreciate and understand the principles and practices of the present invention.

As explained above in the Background, the stomachs of ruminant animals (bovine, ovine, and caprine) are commonly used in the production of edible products as well as inedible products. The stomachs are collectively known as tripe after further processing. Ruminants have four anatomical stomachs which include first the rumen (paunch), secondly the reticulum (honeycomb), thirdly the omasum (bible), and lastly the abomasum or (rennet). After the viscera (stomachs and internal organs) are removed from the animal during slaughter, the organs and stomachs are manually separated and moved to their respective product area for processing and packaging. As for the stomachs, the abomasum is cut to separate it from the small intestines and the omasum. The omasum is then removed from the rumen and reticulum.

It is contemplated that the processing techniques described herein may be applied to any animal parts and/or organs such as stomachs, aortas, and rectums, for example. In particular, the described processing techniques are useful for removing exterior fat found on animal organs.

Figure 1:
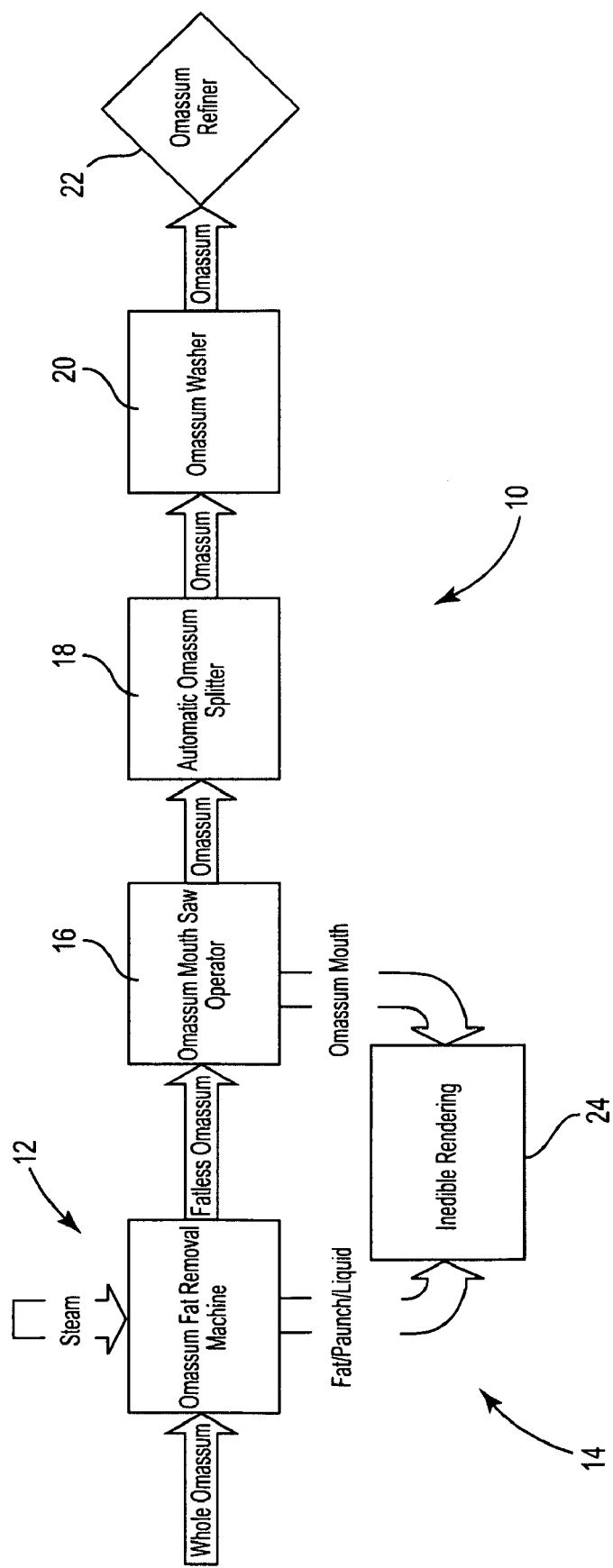
FIG. 1 is a flowchart showing an exemplary animal stomach processing procedure including a steam fat removal process and optional fat recovery process.
Figure 2:
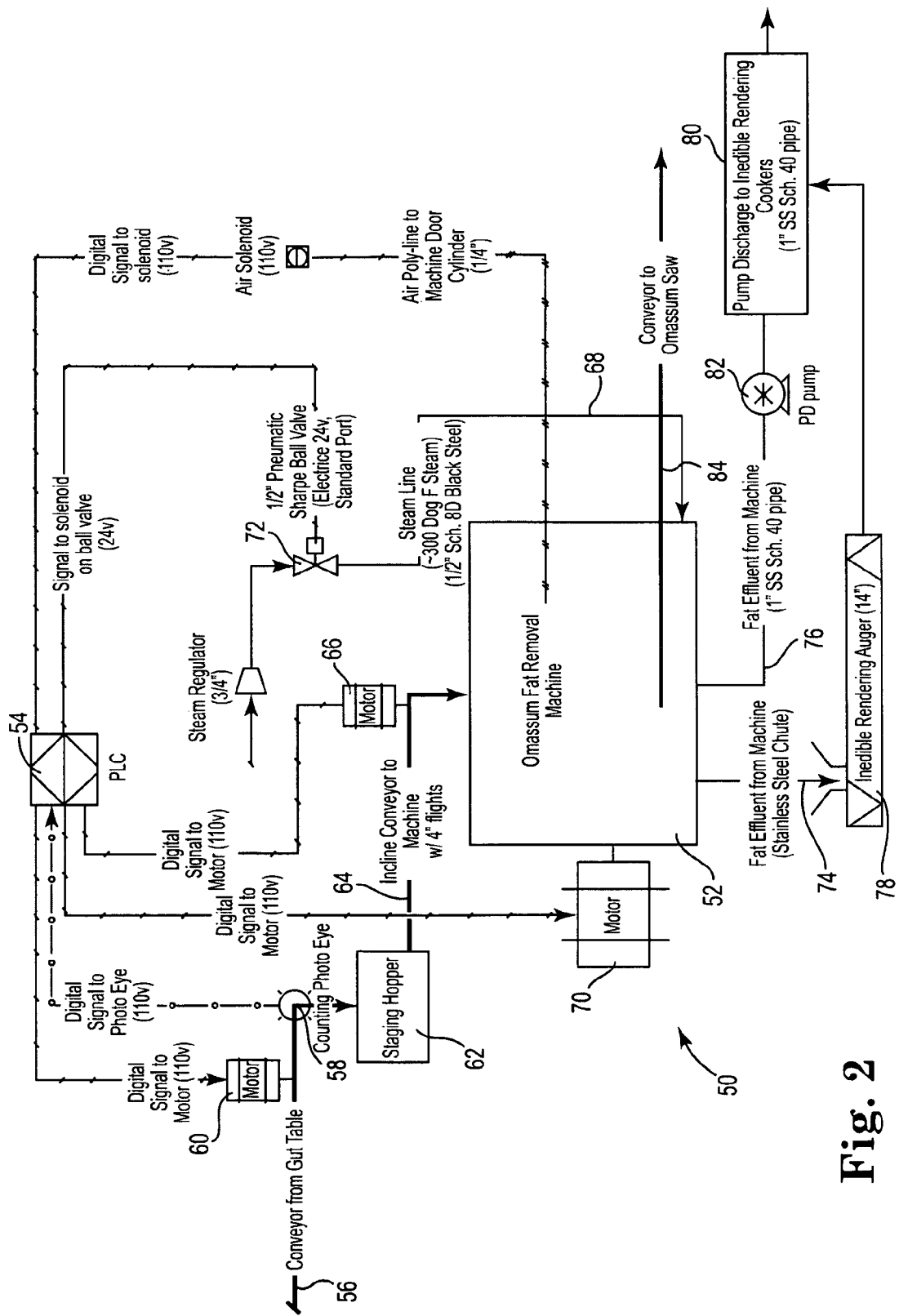
FIG. 2 shows a schematic of an exemplary animal stomach processing system that can be used for fat removal and optional fat recovery.

FIG. 1 shows a flowchart of an animal stomach processing procedure 10 including a steam fat removal process 12 and optional fat recovery process 14. FIG. 2 shows a schematic of an omasum processing system 50 that can be used for fat removal process 12 and optional fat recovery process 14. Stomach processing procedure 10 and system 50 are described with respect to omasum processing but can be adapted for use processing any animal stomach, stomach portion, or combinations thereof. Typically whole omasum are processed. Any animal stomach in any state can be processed by fat removal process 12 and optional fat recovery process 14. The whole omasum typically comprise all the exterior fat that was present when the omasum was harvested from the animal but any desired portion of the exterior fat can be removed before the omasum is processed by fat removal process 12 and fat recovery process 14.

Stomach processing procedure 10, as shown, is exemplary and includes fat removal process 12, optional fat recovery process 14, cutting process 16, splitting process 18, washing process 20, and refining process 22. In the fiat removal process 12 whole omasum is provided to a fat removal machine 52, shown schematically in FIG. 2 and which is described in more detail below. Generally, fat removal machine 52 functions to agitate the omasum in the presence of steam for a period of time sufficient to remove a desired portion of the exterior fat of the omasum. After the omasum is processed by fat removal machine 52, the omasum is provided to a cutting station where cutting process 16 takes place. Cutting process 16 removes the omasum mouth and provides the omasum mouth to an inedible rendering process 24. Next, the omasum moves through splitting process 18 and washing process 20. Finally, the omasum is refined at refining process 22.

Optionally, all or any portion of the fat removed in fat removal process 12 is recovered by fat recovery process 14. In an exemplary process, recovered fat is provided to inedible rendering process 24 but can be processed and/or disposed of in any desired manner.

Omasum processing system 50, as illustrated, is exemplary and includes a programmable logic controller (PLC) 54 that provides control functionality to processing system 50. Processing system 50 includes conveyor 56, having a sensor 58 for counting omasum provided by conveyor 56, driven by motor 60, and controlled by PLC 54. Conveyor 56 is positioned relative to staging hopper 62, which provides omasum to inclined conveyor 64 driven by motor 66 and controlled by PLC 54. Conveyor 64 provides omasum to fat removal machine 52. Fat removal machine 52 functions to agitate the omasum in the presence of steam provided by steam supply 68.

Fat removal machine 52 is driven by motor 70 controllable by PLC 54. Steam supply 68 includes valve 72 controllable by PLC 54.

Fat removal machine 52 processes omasum in batches and comprises internal structure that agitates the omasum in the presence of steam to remove a desired portion of the external fat of the omasum. An exemplary fat removal machine comprises a LaParmnentiere 100C and is shown schematically in FIG. 3. Generally, any stainless bowl type washing machine that can be modified to provide steam to an interior chamber of the machine can be used. Equipment that can be used is also available from Kentmaster and Torras. As shown, fat removal machine 52 includes exemplary plate 53 with holes 55 but any desired plate can be used such as plates including one or more of holes, ridges, grooves, slots, and/or any structure that can provide an abrasive unction. Steam supply 68 is plumbed to fat removal machine 52 and provides steam to an interior chamber 57 of fat removal machine 52. Steam supply 68 may be provided to any desired portion of fat removal machine 52 such as by plumbing one or more steam lines to the interior chamber 57. Steam may be provided from below, from the side, and from the top, and from any combination of these. Any desired nozzles, jets, orifices, diffusers, and the like as well as combinations thereof can be used to deliver steam to interior chamber 57.

Fat removal machine 52 also includes fat effluent drain structure 74 and/or fat effluent drain structure 76. Fat effluent drain structure 74 delivers fat effluent to inedible rendering auger 78. Fat effluent drain 76 structure delivers fat effluent to inedible rendering process 80 and, as shown, includes optional pump 82. Fat effluent drain structure 74 preferably comprises an open system while fat effluent drain structure 76 preferably comprises a closed system, which includes one or more pumps and/or delivery systems such as pump 82.

There are four aspects that contribute to removal of fat from organs: time in machine, temperature (Steam), load size, and wheel type.

The amount of time the organs spend in the machine affects the amount of fat that can be removed in several ways. The longer the pieces are in the machine the hotter they will get from the steam making it easier for the fat to be removed. The other effect time has on the fat removal is the accumulative time effect from a grinding action. If one minute in the machine is good, 2 minutes is better and so on. The limiting factor for time in the machine is machine size/capacity, as well as quality of product processed. Time in the machine can be increased for maximum fat removal but, depending on the part and/or organ being processed, quality may be reduced.

The temperature in the machine needs to be high to achieve two things. First the steam helps to make the fat soft so that it is easily removable and in some cases probably melts the fat. Secondly the steam achieves a high enough temperature to slightly cook and/or stiffen the connective tissue near the surface just under the fat layer. The advantage to this is that it creates a stiffer surface between the fat and the steel wheel, which allows the fat to grind off much more easily.

Because the wheel has a grinding effect, the amount of weight that can be placed in the machine also helps with fat removal. One desire is to maximize the downward force on the surface against the steel wheel to make the grinding force as high as possible without damaging the yield of finished product. This can be accomplished by maximizing load size as the product stacks on top of each other in the machine it puts more force on the surface of the bottom piece and the wheel allowing the fat to be removed more quickly. The size of the load is typically limited by production speed and/or machine size/capacity.

In industrial food processing washing machines such as the La Parmentiere models, there are multiple types of wheels that can be used for different applications. In the past each wheel was used in a washing application where the material inside was submerged in water during agitation. After repeated testing, it has been found that a specific wheel is preferred for fat removal. An exemplary wheel for fat removal comprises a stainless steel plate with a plurality of approximately ⅜" machined holes through the plate. The plate may comprise any number and size of holes. This wheel creates a grinding surface as it spins and also allows the removed fat to sift/drain down through the holes in the plate. The plate may comprise any desired structure that provides fat removal by an abrasive mechanism and that allows fat to be drained/removed from the machine. Plates can include one or more of holes, ridges, grooves, slots, and/or any structure that can provide such abrasive function.

An exemplary process that can be used for processing omasum, honeycomb, and/or paunch, for example, starts with separating the omasum from the other stomachs on a viscera table (not shown). The abomasum stomach may also be processed to remove fat as described herein. In the case of honeycomb processing, the paunch and honeycomb is hung on a chain conveyor and sliced open over a pit to allow the internal contents to spill out. This leaves the paunch and honeycomb hanging open with stomach internal surfaces exposed outward. The paunch and honeycomb then goes through an automated spraying rinse to help remove the internal contents.

From the viscera table (not shown) the omasum is placed on a conveyor 56, which is slightly inclined. The inclined conveyor 56 has sensor 58 (such as a photo eye, for example) at the end, in communication with PLC 54 and which counts how many pieces of omasum fall over the end of conveyor 56 onto conveyor 64. Once on conveyor 64 there is a steeper incline as conveyor 64 functions as the feed conveyor to fat removal machine 52 (La Parmentiere 100C, for example), which is used for fat removal. Feed conveyor 64 has raised sides on the back end that function to provide hopper 62 to stage the omasum in batches prior to delivery to fat removal machine 52 for fat removal. Typically, a batch consists of 6-8 omasum but any desired number may be used. After sensor 58 has counted a desired batch, feed conveyor 64 starts (as controlled by PLC 54) and empties the batch of omasum into fat removal machine 52. In an exemplary process, fat removal machine 52 spins for the amount of time it takes to build up the next batch, such as 1 to 2 minutes, for example, or whichever occurs first.

Steam has a temperature of greater than 212 degrees F. Any combination of temperature and pressure that produces steam can be used. For omasum processing, as an example, steam at approximately 10-20 psi and about 240 to 270 degrees F. is injected into fat removal machine 52, preferably, on the underside below the spinning wheel that the omasum rotates on during fat removal although the steam can steam can introduced anywhere. The fat is then both melted and rubbed off from the cooperative action of heat and friction of the spinning wheel and steam. The fat effluent drains to the bottom of fat removal machine 52 and flows into drain 74, which then pours into auger 78 that takes the material to inedible rendering process 80. Optionally, the fat effluent may be discharged into drain 76, which feeds pump 82 and which pumps the fat effluent to inedible rendering process 80.

After the fat removal process is complete a pneumatic door of fat removal machine 52 opens and ejects the omasum (now at least partially free of fat) onto conveyor 84 that provides the omasum to sawing process 16. The omasum is then split in half with an automated saw at process 18 and staged for washing process 20. After the appropriate batch size, the omasum (now halved) go through washing process 20 and refining process 22 with hot water agitation and/or chemical treatment. The omasum product is deemed edible after refining process 20 and boxed appropriately.

In the case of processing paunch, after the honeycomb has been removed the paunch is then split in half vertically in one exemplary process. The paunch and honeycomb do not need to be separated, however, and can be processed together or separately. Also, the paunch does not need to be split and can be processed whole or divided into any number of portions. If split, the two paunch pieces continue on a chain conveyor to an automatic dropper that drops the paunch halves onto a conveyor to stage a batch for a washing process before being processed in a fat removal machine such as fat removal machine 52. In one exemplary process, the batches are staged in groups of approximately twelve paunch and are processed in a fat removal machine for approximately two minutes. Once the appropriate batch size has been counted by sensor, the conveyor activates and fills a hopper. In one exemplary process, the batches in the washing machine comprise approximately two fat removal machine batches or forty-eight paunch halves but any desired number can be processed. After the hopper has received two loads it dumps into the fat removal machine. After the washing process, the paunch is then provided to a refiner. After the refiner the paunch is boxed as finished product, or sent on for further processing. In an exemplary process, plural lines of washing machines and refiners can be used. Each line is filled with a wash load in an alternating pattern between the plural lines, for example.

Removing external fat and optionally recovering such fat from omasum (or any other animal stomach) prior to further processing provides many advantages. Removing exterior fat from omasum (or any other stomach, organ, or animal part having fat) as described herein is faster, more efficient, and minimizes possible damage to the omasum as compared to manually cutting away such fat. Processing as described herein helps to reduce subsequent washing time and/or water needed. The processes described herein are automated and thus easy to maintain and optimize. Recovering fat removed from omasum prior to conventional washing of the omasum helps to reduce fats, oils, and greases (FOG) in the wastewater stream of the processing facility. This is because the washing step can cause some fat to become part of the wastewater stream where it is highly emulsified and difficult to remove from the wastewater stream. Fat recovered from omasum can be further processed and sold as a product such as tallow based products, for example.

The invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the invention should not be limited to the structures described herein, but only by the structures described by the language of the claims and the equivalents of those structures.

What is claimed is:

1. A method for processing stomachs of ruminant animals comprising:
   providing at least a portion a stomach of a ruminant animal, the at least a portion of a stomach having external fat, and
   treating the at least a portion of a stomach with steam to remove at least a portion of the external fat.

2. The method of claim 1, wherein the at least a stomach portion of a ruminant animal includes one or more of omasum, rumen (paunch), reticulum (honeycomb), and abomasum.

3. The method of claim 1, further comprising treating the at least a portion of a stomach for 30 seconds to 180 seconds with steam.

4. The method of claim 3, wherein the steam comprises a pressure between 10 psi and 20 psi.

5. The method of claim 1, further comprising washing the at least a portion of a stomach after treating the at least a portion of a stomach with steam.

6. The method of claim 1, further comprising recovering at least a portion of the fat removed from the at least a portion of a stomach.

7. The method of claim 6, further comprising processing the at least a portion of the fat removed from the at least a portion of a stomach into a saleable product.

8. The method of claim 1, further comprising agitating the at least a portion of a stomach.

9. The method of claim 1, further comprising a washing process.

10. A method for reducing fat, oils, and greases in the wastewater stream of an animal processing facility comprising:
    providing at least a portion a stomach of a ruminant animal, the at least a portion of a stomach having external fat,
    treating the at least a portion of a stomach with steam to remove at least a portion of the external fat;
    washing the at least a portion of a stomach after treating the at least a portion of a stomach with steam; and
    recovering at least a portion of the fat removed from the at least a portion of a stomach.

11. The method of claim 10, wherein the at least a stomach portion of a ruminant animal comprise omasum.

12. The method of claim 10, further comprising processing the at least a portion of the fat removed from the at least a portion of a stomach into a saleable product.

13. A system for processing stomachs of ruminant animals, the system comprising:
    a fat removal machine operatively coupled to a source of steam;
    a fat effluent drain operatively coupled to an inedible cooker; and
    a programmable logic controller.

14. The system of claim 13, wherein the fat effluent drain comprises an open system.

15. The system of claim 14, further comprising an inedible rendering auger between the fat effluent drain and the inedible cooker.

16. The system of claim 13, wherein the fat effluent drain comprises a closed system.

17. The system of claim 16, further comprising a pump between the fat effluent drain and the inedible cooker.

18. The system of claim 13, wherein the fat removal machine is operatively positioned relative to a staging hopper and conveyor controlled by the programmable logic controller.

19. The system of claim 18, wherein the staging hopper is positioned relative to a feed conveyor controlled by the programmable logic controller.

20. The system of claim 13, wherein the source of steam comprises a valve controlled by the programmable logic controller.

21. The system of claim 13, wherein the fat removal machine comprises a rotating plate having a plurality of structures that cause abrasion to a product processed by the fat removal machine.

* * * * *

UNITED STATES PATENT AND TRADEMARK OFFICE
CERTIFICATE OF CORRECTION

PATENT NO. : 7,887,398 B2            Page 1 of 1
APPLICATION NO. : 12/436414
DATED : February 15, 2011
INVENTOR(S) : Christopher L. Packer et al.

It is certified that error appears in the above-identified patent and that said Letters Patent is hereby corrected as shown below:

On the Title page, in Item (76), in "Inventors", in column 1, line 4,
delete "Fuju Wu" and insert -- Fuji Wu --, therefor.

In The Specifications:

In column 1, line 29, delete "fumen" and insert -- rumen --, therefor.

In column 2, line 20, delete "lumen," and insert -- rumen, --, therefor.

In column 2, line 45, delete "embodiments" and insert -- embodiment, --, therefor.

In column 2, line 55, after "methods" insert -- , --.

In column 2, line 59, after "drawings" insert -- , --.

In column 3, line 47, delete "fiat", and insert -- fat --, therefor.

In column 4, line 17, delete "LaParmnentiere" and insert -- LaParmentiere --, therefor.

In column 4, line 25, delete "unction." and insert -- function. --, therefor.

In column 5, line 13, delete "w/heel" and insert -- wheel --, therefor.

In column 5, line 60, delete "F." and insert -- F --, therefor.

Signed and Sealed this
Twenty-sixth Day of April, 2011

David J. Kappos
*Director of the United States Patent and Trademark Office*